US012726288B2

(12) United States Patent
Wang et al.

(10) Patent No.: US 12,726,288 B2
(45) Date of Patent: Sep. 1, 2026

(54) CORRECTION OF REFERENCE CLOCK SYSTEMATIC ERRORS OF USER EQUIPMENT

(71) Applicant: Nokia Technologies Oy, Espoo (FI)

(72) Inventors: Yonggang Wang, Shanghai (CN); Thomas Haaning Jacobsen, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 292 days.

(21) Appl. No.: 18/554,276

(22) PCT Filed: Apr. 6, 2021

(86) PCT No.: PCT/CN2021/085703

§ 371 (c)(1),
(2) Date: Oct. 6, 2023

(87) PCT Pub. No.: WO2023/213278

PCT Pub. Date: Oct. 13, 2023

(65) Prior Publication Data

US 2024/0214096 A1 Jun. 27, 2024

(51) Int. Cl.
*H04J 3/06* (2006.01)
*H04L 5/00* (2006.01)
*H04W 56/00* (2009.01)

(52) U.S. Cl.
CPC .......... *H04J 3/0661* (2013.01); *H04L 5/0051* (2013.01); *H04W 56/0015* (2013.01); *H04W 56/004* (2013.01)

(58) Field of Classification Search
None
See application file for complete search history.

(56) References Cited

U.S. PATENT DOCUMENTS

| | | | | |
|---|---|---|---|---|
| 12,108,353 | B2 * | 10/2024 | Sun | H04W 56/00 |
| 2003/0174690 | A1 * | 9/2003 | Benveniste | H04W 74/02 370/350 |
| 2019/0190635 | A1 | 6/2019 | Goel et al. | |
| 2021/0337491 | A1 * | 10/2021 | Xu | G01S 19/256 |
| 2022/0039045 | A1 * | 2/2022 | Sun | H04W 56/0045 |

FOREIGN PATENT DOCUMENTS

| | | | |
|---|---|---|---|
| CN | 109587785 | A | 4/2019 |
| CN | 109743127 | A | 5/2019 |

OTHER PUBLICATIONS

"3rd Generation Partnership Project; Technical Specification Group Radio Access Network; NR; Radio Resource Control (RRC) protocol specification (Release 16)", 3GPP TS 38.331, V16.2.0, Sep. 2020, pp. 1-921.

(Continued)

*Primary Examiner* — Anh Ngoc M Nguyen
(74) *Attorney, Agent, or Firm* — Robert P. Michal, Esq.; Rimon PC

(57) ABSTRACT

Embodiments of the present disclosure relate to devices, methods, apparatuses and computer readable storage media of the correction of reference clock systematic errors of the UE. The method comprises generating, at a first device, reference time information comprising a first local timestamp of the first device at a boundary of a system frame number; and transmitting the reference time information to a second device for time synchronization between the first device and the second device. In this way, errors on the absolute time delivery to the UE that are not visible on the air interface can be captured and the accuracy of the time synchronization between the UE and the gNB can be improved.

8 Claims, 5 Drawing Sheets

(56) References Cited

OTHER PUBLICATIONS

"Revised WID: Enhanced Industrial Internet of Things (IoT) and ultra-reliable and low latency communication (URLLC) support for NR", 3GPP TSG RAN Meeting #88e, RP-201310, Agenda: 9.10.5, Nokia, Jun. 29-Jul. 3, 2020, 6 pages.
"Summary#1 of email discussion [102-e-NR-IIOT_URLLC_enh-05]", 3GPP TSG RAN WG1 Meeting #102-e, R1-2007068, Agenda: 8.3.4, Huawei, Aug. 17-28, 2020, 52 pages.
"Reply LS on propagation delay compensation enhancements", 3GPP TSG-RAN WG2 Meeting #112 Electronic, R2-2010837, TSG RAN WG2, Nov. 2-13, 2020, 1 page.
"Enhancement for support of time synchronization", 3GPP TSG RAN WG1 #104bis-e, R1-2102396, Agenda: 8.3.4, OPPO, Apr. 12-20, 2021, pp. 1-6.
International Search Report and Written Opinion received for corresponding Patent Cooperation Treaty Application No. PCT/CN2021/085703, dated Jan. 7, 2022, 10 pages.
"RAN3 impacts of propagation delay compensation enhancements", 3GPP TSG-RAN WG3 Meeting #111-e, R3-210093, Agenda: 21.2, Nokia, Jan. 25-Feb. 4, 2021, 5 pages.
"Discussion on enhancements for support of propagation delay compensation for accurate time synchronization", 3GPP TSG RAN WG2 #111-e, R2-2006922, Agenda: 8.5.2, Nokia, Aug. 17-28, 2020, 8 pages.
Extended European Search Report received for corresponding European Patent Application No. 21935514.6, dated Dec. 10, 2024, 7 pages.

* cited by examiner

CORRECTION OF REFERENCE CLOCK SYSTEMATIC ERRORS OF USER EQUIPMENT

RELATED APPLICATION

This application was originally filed as PCT Application No. PCT/CN2021/085703, filed on Apr. 6, 2021, of which is incorporated herein by reference in its entirety.

FIELD

Embodiments of the present disclosure generally relate to the field of telecommunication and in particular to devices, methods, apparatuses and computer readable storage media of the correction of reference clock systematic errors of the User Equipment (UE).

BACKGROUND

Accurate time synchronization was introduced in Release-16 of fifth generation (5G) New Radio (NR), in order to support Industrial Internet of Things (IIoT) use-cases and Time Sensitive Networking (TSN) or Time Sensitive Communications (TSC) applications.

Time synchronization shall ensure that different nodes of the 5G network share the same Time of Day (ToD) clock. In Release 17, the enhancements for the support of time synchronization mainly focus on uplink time synchronization for TSN and propagation delay compensation enhancements.

SUMMARY

In general, example embodiments of the present disclosure provide a solution of the correction of reference clock systematic errors of the UE.

In a first aspect, there is provided a first device. The first device comprises at least one processor; and at least one memory including computer program codes; the at least one memory and the computer program codes are configured to, with the at least one processor, cause the first device at least to generate reference time information comprising a first local timestamp of the first device at a boundary of a system frame number; and transmit the reference time information to a second device for time synchronization between the first device and the second device.

In a second aspect, there is provided a second device. The second device comprises at least one processor; and at least one memory including computer program codes; the at least one memory and the computer program codes are configured to, with the at least one processor, cause the second device at least to receive, from a first device, reference time information for time synchronization between the first device and the second device, the reference time information comprising a first local timestamp of the first device at a boundary of a system frame number; compare the first local timestamp of the first device with a second local timestamp of the second device at the boundary of the system frame number; and in accordance with a time difference between the first local timestamp and the second local timestamp exceeds a threshold difference, initiate a time correction between the first device and the second device for the time synchronization.

In a third aspect, there is provided a method. The method comprises generating, at a first device, reference time information comprising a first local timestamp of the first device at a boundary of a system frame number; and transmitting the reference time information to a second device for time synchronization between the first device and the second device.

In a fourth aspect, there is provided a method. The method comprises receiving, at a second device and from a first device, reference time information for time synchronization between the first device and the second device, the reference time information comprising a first local timestamp of the first device at a boundary of a system frame number; comparing the first local timestamp of the first device with a second local timestamp of the second device at the boundary of the system frame number; and in accordance with a time difference between the first local timestamp and the second local timestamp exceeds a threshold difference, initiating a time correction between the first device and the second device for the time synchronization.

In a fifth aspect, there is provided an apparatus comprising means for generating, at a first device, reference time information comprising a first local timestamp of the first device at a boundary of a system frame number; and means for transmitting the reference time information to a second device for time synchronization between the first device and the second device.

In a sixth aspect, there is provided an apparatus comprising means for receiving, at a second device and from a first device, reference time information for time synchronization between the first device and the second device, the reference time information comprising a first local timestamp of the first device at a boundary of a system frame number; means for comparing the first local timestamp of the first device with a second local timestamp of the second device at the boundary of the system frame number; and means for in accordance with a time difference between the first local timestamp and the second local timestamp exceeds a threshold difference, initiating a time correction between the first device and the second device for the time synchronization.

In a seventh aspect, there is provided a computer readable medium having a computer program stored thereon which, when executed by at least one processor of a device, causes the device to carry out the method according to the third aspect.

In an eighth aspect, there is provided a computer readable medium having a computer program stored thereon which, when executed by at least one processor of a device, causes the device to carry out the method according to the fourth aspect.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where.

Throughout the drawings, the same or similar reference numerals represent the same or similar element.

DETAILED DESCRIPTION

Figure 1:
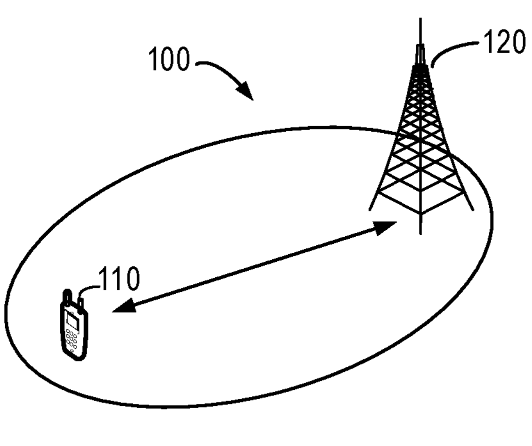
FIG. 1 illustrates an example environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish functionalities of various elements. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) new radio (NR) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR Next Generation NodeB (gNB), a Remote Radio Unit (RRU), a radio header (RH), a remote radio head (RRH), a relay, a low power node such as a femto, a pico, and so forth, depending on the applied terminology and technology. A RAN split architecture comprises a gNB-CU (Centralized unit, hosting RRC, SDAP and PDCP) controlling a plurality of gNB-DUs (Distributed unit, hosting RLC, MAC and PHY). A relay node may correspond to DU part of the IAB node.

The term "terminal device" refers to any end device that may be capable of wireless communication. By way of example rather than limitation, a terminal device may also be referred to as a communication device, user equipment (UE), a subscriber station (SS), a portable subscriber station, a mobile station (MS), or an access terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to Mobile Termination (MT) part of the integrated access and backhaul (IAB) node (a.k.a. a relay node). In the following description, the terms “terminal device”, “communication device”, “terminal”, “user equipment” and “UE” may be used interchangeably.

Although functionalities described herein can be performed, in various example embodiments, in a fixed and/or a wireless network node, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

FIG. 1 shows an example communication network 100 in which embodiments of the present disclosure can be implemented. As shown in FIG. 1, the communication network 100 may comprise a terminal device 110 (hereinafter may also be referred to as a UE 110 or a first device 110). The communication network 100 may further comprise a network device 120 (hereinafter may also be referred to as a gNB 120 or a second device 120). The network device 120 can manage a cell 102. The UE 110 may communicate with the gNB 120 in the coverage of the cell 102.

It is to be understood that the number of network devices and terminal devices shown in FIG. 1 is given for the purpose of illustration without suggesting any limitations. The communication network 100 may include any suitable number of network devices and terminal devices.

As described above, the enhancements for the support of time synchronization in Released 17 mainly focus on uplink time synchronization for TSN and propagation delay compensation enhancements. While focus from RAN2 side is to identify the time synchronization accuracy budget per Uu interface, RAN1 aims to identify and evaluate the achievable accuracy of propagation delay estimation techniques.

The Uu interface is understood as the maximum 5GS time synchronization error between the UE and a gNB Distributed Unit (gNB-DU). The errors outside of the Uu interface is to a large extend, not captured by the existing procedures, and some is not measurable with the existing framework due to the lack of feedback to a trusted anchor, for example, a single node in the 5GS system.

Due to the dynamic nature of the radio link, it is challenging to deliver time synchronization over Uu interface from gNB to UE. Using the 5G NR control plane, time synchronization information, i.e., gNB clock, can be delivered from a gNB to served UEs using two methods, namely a broadcast method where the time information is encoded in a SIB9 message and a unicast method where the time information is encoded in a unicast RRC message.

In both mentioned methods, the encoded time information is the clock time of the gNB that corresponds to the ending boundary of a specific radio system frame (refSFN), where the refSFN is indicated to the UE either implicitly (in case of broadcast) or explicitly (in case of unicast).

When a UE receives the SIB9/RRC message, it associates the time information with its own refSFN boundary, which is aligned with the refSFN boundary of the gNB. In this way, the underlying 5G radio frame timing at gNB and UE is used as a common reference for delivery of ToD clock.

However, the radio frame boundaries at gNB and UE are not perfectly aligned in time with respect to one another. Downlink frame boundary at UE is shifted by the propagation delay with respect to the corresponding frame boundary at gNB. The propagation delay may be referred to as a time period for radio frame to propagate from gNB to UE over the air. When the UE synchronizes its clock by associating time information carried by SIB9/RRC message with its own refSFN boundary, its clock will be delayed by propagation delay compared to the clock of the gNB.

This is not an issue for of the Uu interface budget is sufficiently large, compared to the maximum experienced propagation delay. For a small indoor scenarios, the propagation delay might not be an issue, but for larger cells, such as a smart grid scenario, or for a very tight Uu interface requirement, the UE needs to compensate the time information received in SIB9/RRC message for the Propagation Delay (PD) e.g. by adding its current PD estimate to the time information.

Acquisition of the PD estimation requires a measurement of the propagation delay, typically estimated from a round trip time (RTT) measurement assuming symmetric DL/UL links. This can either be obtained using the positioning framework (multi-RTT measurements) or through the timing advance (TA) mechanism of the UE.

When the UE is compensating for the DL propagation delay, there will unavoidably be an error to the compensated timestamp. The errors can be caused by the accuracy of the propagation delay estimation, for example, from the TA; clock adjustment accuracy and drift of the UE and gNB SFN timestamp to air interface frame timing.

Some of these errors can be captured as they are reflected in the air interface synchronization procedure, such as transmissions which applies TA. However, other errors cannot be reflected on the air interface and there is currently no UE feedback to the gNB related to these errors. Therefore, the gNB cannot detect and hence correct errors which affect the accuracy of the UE absolute time synchronization.

The present disclosure provides solutions of the correction of reference clock systematic errors of the UE. In this solution, the UE may generate reference time information comprising a first local timestamp of the UE and transmit the reference time information to the gNB for time synchronization between the UE and the gNB. In this way, errors on the absolute time delivery to the UE that are not visible on the air interface can be captured and the accuracy of the time synchronization between the UE and the gNB can be improved.

Principle and implementations of the present disclosure will be described in detail below with reference to FIG. 2, which show a schematic process of the correction of reference clock systematic errors of the UE. For the purpose of discussion, the process 200 will be described with reference to FIG. 1. The process 200 may involve the UE 110, and the gNB 120 as illustrated in FIG. 1.

The gNB 120 can transmit reference time information of gNB 120 to the UE 110 for maintain the time alignment between the UE 110 and the gNB 120. The reference time information of the gNB 120 may comprises system Frame Number (SFN) timestamp of the gNB 120.

In a case where the gNB 120 as shown in FIG. 1 is considered as a gNB Centralize Unit (gNB-CU), the SFN timestamp can be obtained by the gNB 120 from a gNB-DU, which is managed by the gNB 120. In this case, the reference time information of gNB 120 may be generated based on the SFN timestamp of the gNB-DU.

Figure 2:
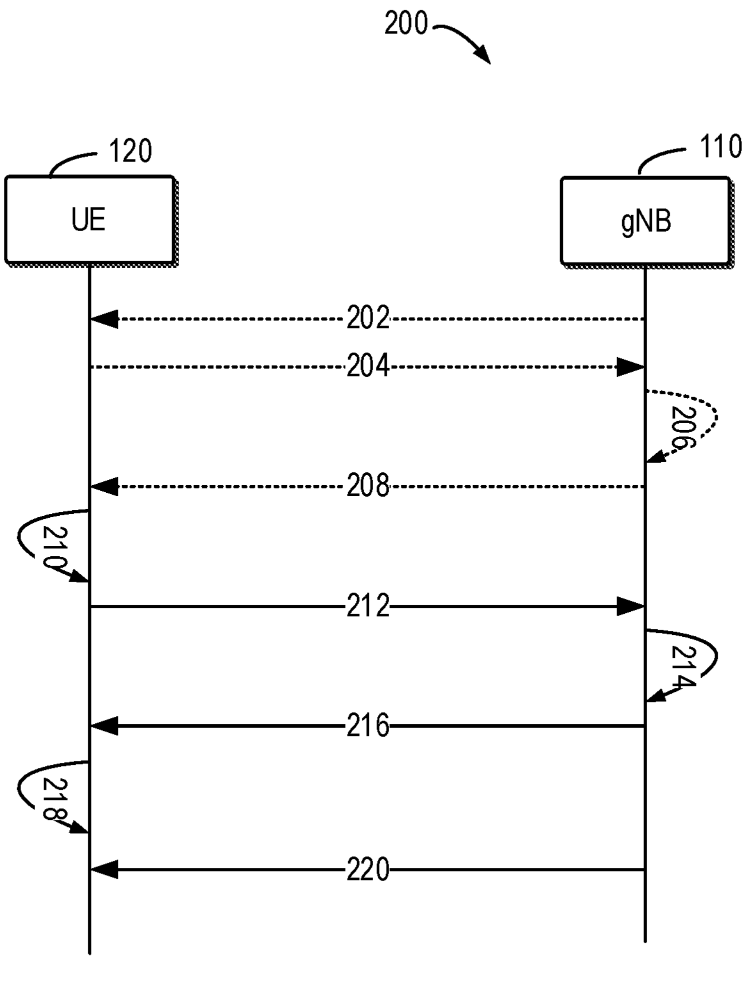
FIG. 2 shows a signaling chart illustrating a process of the correction of reference clock systematic errors of the UE according to some example embodiments of the present disclosure.

As shown in FIG. 2, if a detection of time synchronization between the UE 110 and the gNB 120 is initiated from the gNB 120, the gNB 120 may transmit 202, to UE 110, a request for the UE 110 to deliver the reference time information of UE 110.

After receiving the request from the gNB 120, the UE 110 may generate 210 a local timestamp of the UE 110 at a SFN boundary. The SFN associated with the local timestamp of the UE 110 can be specified by the gNB 120. Alternatively, the SFN can be considered as a current SFN.

Specifically, for generating the local timestamp of the UE 110, a SFN boundary event instance can be timestamped at the UE time tracking instance to generate the local timestamp of the UE 110 at the SFN boundary.

It is also possible that the UE 110 may initiate time synchronization between the UE 110 and the gNB 120 to check for systematic errors. This can be the case if the UE 110 is equipped with a sufficiently stable oscillator and detects a sudden jump in the timing which is not explained by the air interface time and frequency. In this case, the UE 110 may request the gNB 120 to provide an updated of the reference time information.

In some example embodiments, the UE 110 may transmit 204 a request for initiating the time synchronization between the UE 110 and the gNB 120. After receiving the request, the gNB 120 may generate 206 a local timestamp at the boundary of a SFN and transmit 208 the reference time information comprising the local timestamp at the boundary of SFN. Similarly, if the gNB 120 is considered as a gNB-CU, the local timestamp at the boundary of the SFN can be provided from a gNB-DU managed by the gNB 120.

As shown in FIG. 2, after receiving the required reference time information from the gNB 120, the UE 110 may generate 210 a local timestamp of the UE 110 at a SFN boundary. This SFN boundary associated with the local timestamp of the UE 110 may be same with the SFN boundary indicated in the received reference time information of the gNB 120.

After generating the reference time information, the UE 110 may transmit 212 the reference time information to the gNB 120. The gNB 120 may obtain the timestamp of the UE 110 at a SFN boundary and compare 214 the timestamp of the UE 110 at the SFN boundary with the timestamp of the gNB 120 at the same SFN boundary. If the gNB 120 determines that a time difference between the UE 110 and the gNB 120 exceeds a threshold difference, the gNB 120 may determine a time correction of the UE 110 is to be initiated.

In some example embodiments, the gNB 120 may determine a time offset for the time correction between the UE 110 and the gNb 120. The time offset can be determined by the gNB 120 based on the determined time difference between the timestamp of the UE 110 and the timestamp of the gNB 120 at the same SFN boundary. The gNB 120 may transmit 216 the time offset for the time correction to the UE 110. Then the UE 110 may perform 218 the time correction based on the time offset indicated in the received indication.

In some example embodiments, the gNB 120 may perform a physical layer reconfiguration procedure to improve the time synchronization between the UE 110 and gNB 120. In this case, the gNB 120 may transmit 220 information about the physical layer reconfiguration to the UE 110. For example, the information about the physical layer reconfiguration may be used for increasing the delivery rate and/or granularity of the reference time information of the gNB 120, the UL and DL reference signals bandwidth and periodicity and the PD signaling resolution (e.g. NTA or Rx-Tx). Furthermore, the information about the physical layer reconfiguration may also be used for reconfiguring the PD estimation procedure.

As another option, if the large time difference the timestamp of the UE 110 and the timestamp of the gNB 120 at the same SFN boundary is due to high UE clock drift, the gNB 120 may attempt to reconfigure the PHY interface for enhanced accuracy.

Alternatively, the gNB 120 may also transmit 218, to access and mobility management function (AMF), an indication that the UE 110 has a poor 5GS time synchronization accuracy and a time correction is to be performed for the UE 110.

In this way, errors on the absolute time delivery to the UE that are not visible on the air interface can be captured and the accuracy of the time synchronization between the UE and the gNB can be improved.

Figure 3A:
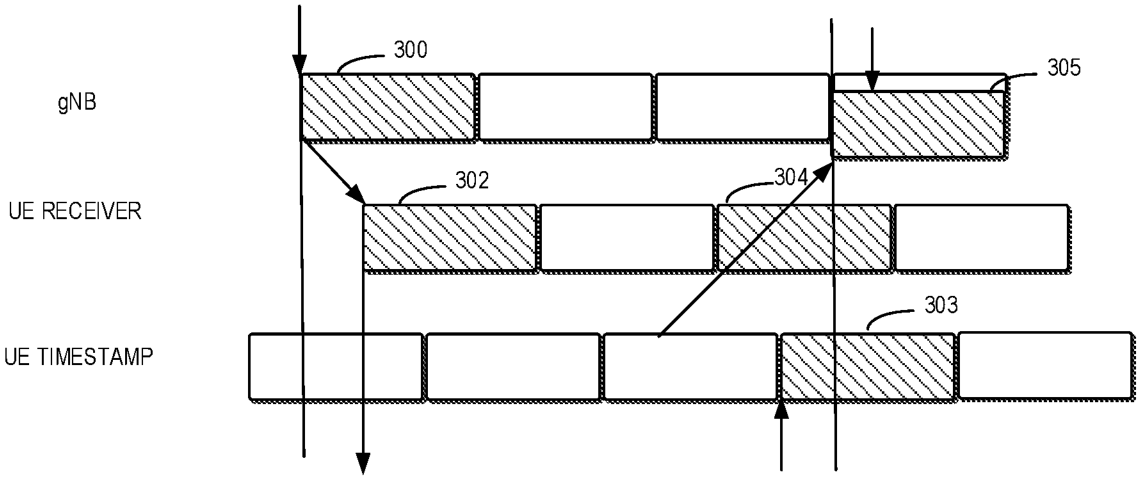
FIGS. 3A and 3B shows schematic diagrams for the correction of reference clock systematic errors of the UE according to some example embodiments of the present disclosure.
Figure 3B:
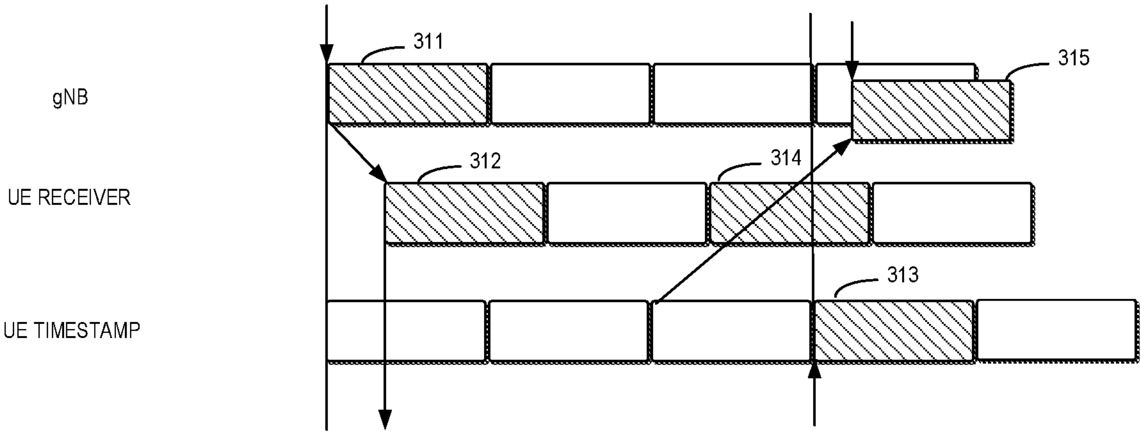

FIGS. 3A and 3B shows schematic diagrams for the correction of reference clock systematic errors of the UE according to some example embodiments of the present disclosure.

In the example shown in FIG. 3A, the synchronization error is due to the other error components, where the real PD=400 ns, the estimated TA=800 ns, the PD compensation=TA/2=400 ns and sum of other error components=400 ns.

As shown in FIG. 3A, assuming 5GS GM time at SFN 0 (block 301)=2020-11-3-00:00:00.000.000.000. The UE absolute offset can be calculated by:

The UE absolute time at UE received SFN 0 (block 302)=SFN absolute timestamp+PDC+other error components=000.000+400 ns+400 ns=000.800.

Timestamp on UE transmitted SFN 3 (block 303)=UE absolute time at UE transmitted SFN 3 (block 304)−TA=030.800−800 ns=030.000

UE absolute time offset=5GS GM time at gNB received SFN 3 (block 303)−(Timestamp on UE transmitted SFN 3+PDC+other error components)=030.000−(030.000+400 ns+400 ns)=−800 ns The UE may adjust its local time by the above offset, i.e., UE absolute time+offset/2, i.e., from 000.800 to 000.400.

In this example, although the gNB finds the received SFN from UE uplink is aligned to its own SFN, but there is 400 ns synchronization error between reference clock of 5GS and UE.

In the example shown in FIG. 3B, the synchronization error is in fact caused by an overestimated TA-based PD estimation, where the Real PD=400 ns, the estimated TA=400 ns, the PD compensation=TA/2=200 ns, the PD estimation error=200 ns, and the sum of other error components=0.

As shown in FIG. 3B, assuming 5GS GM time at SFN 0 (block 311)=2020-11-3-00:00:00.000.000.000. The UE absolute offset can be calculated by:

UE absolute time at UE received SFN 0 (block 312)= SFN absolute timestamp+PDC=000.000+200 ns=000.200

Timestamp on UE transmitted SFN 3 (block 313)= UE absolute time at UE transmitted SFN 3 (block 314)−TA=030.200−400 ns=020.800

UE absolute time offset=5GS GM time at gNB received SFN 3 (block 315)−(Timestamp on UE transmitted SFN 3 (block 313)+PDC)=030.400−(020.800+200 ns)=400 ns The UE may adjust its local time by the correction, i.e., UE absolute time+offset/2, i.e., from 000.200 to 000.400.

The solution of the present disclosure may introduce new features in the signaling exchange between the UE and network. Firstly, the reference time information IE will be captured in the ULnformationTransfer message. The impact on the 3GPP protocol may be represented as below:

TABLE 1

Example of message definations
ULInformationTransfer message

```
-- ASN1START
-- TAG-ULINFORMATIONTRANSFER-START
ULInformationTransfer ::=             SEQUENCE {
        criticalExtensions                    CHOICE {
            ulInformationTransfer                   ULInformationTransfer-IEs,
            criticalExtensionsFuture                SEQUENCE { }
        }
    }
ULInformationTransfer-IEs ::=         SEQUENCE {
        dedicatedNAS-Message          DedicatedNAS-Message             OPTIONAL,
        lateNonCriticalExtension      OCTET STRING                     OPTIONAL,
        nonCriticalExtension          ULInformationTransfer-v1610-IEs  OPTIONAL
    }
ULInformationTransfer-v1610-IEs ::= SEQUENCE {
        referenceTimeInfo-r16     ReferenceTimeInfo-r16          OPTIONAL,   -- Need R
        nonCriticalExtension      SEQUENCE { }                   OPTIONAL
    }
-- TAG-ULINFORMATIONTRANSFER-STOP
-- ASN1STOP
```

Secondly, a new JE synchronization error compensation will be captured in the DLInformationTransfer message. The impact on the 3GPP protocol may be represented as below:

TABLE 2

Example of message definitions

Upon receiving DLInformationTransfer message, the UE shall:
1> if dedicatedNAS-Message is included:
2> forward dedicatedNAS-Message to upper layers.
1> if referenceTimeInfo is included:
2> calculate the reference time based on the time, referenceSFN and timeInfoType if it is included;
2> calculate the uncertainty of the reference time based on the uncertainty, if uncertainty is included;
2> inform upper layers of the reference time and, if uncertainty is included, of the uncertainty.
2> inform upper layers of the synchronization error compensation, if ue absolute time offset is included.

DLInformationTransfer message

```
-- ASN1START
-- TAG-DLINFORMATIONTRANSFER-START
DLInformationTransfer ::=             SEQUENCE {
    rrc-TransactionIdentifier           RRC-TransactionIdentifier,
    criticalExtensions                  CHOICE {
        dlInformationTransfer               DLInformationTransfer-IEs,
        criticalExtensionsFuture            SEQUENCE { }
        }
}
```

TABLE 2-continued

```
DLInformationTransfer-IEs ::=         SEQUENCE {
  dedicatedNAS-Message              DedicatedNAS-Message                OPTIONAL, -- Need N
  lateNonCriticalExtension          OCTET STRING                        OPTIONAL,
  nonCriticalExtension              DLInformationTransfer-v1610-IEs     OPTIONAL
}
DLInformationTransfer-v1610-IEs ::= SEQUENCE {
  referenceTimeInfo-r16             ReferenceTimeInfo-r16      OPTIONAL,    -- Need R
  ueAbsoluteTimeOffsetNS            INTEGER (0..4095)          OPTIONAL,    -- Need N
  nonCriticalExtension              SEQUENCE { }               OPTIONAL
}
-- TAG-DLINFORMATIONTRANSFER-STOP
-- ASN1STOP
```

Figure 4:
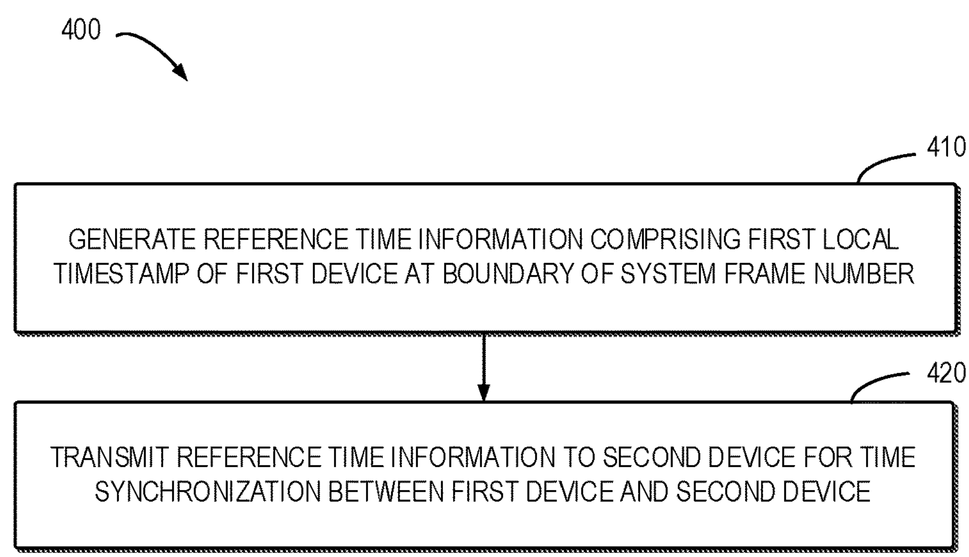
FIG. 4 shows a flowchart of an example method of the correction of reference clock systematic errors of the UE according to some example embodiments of the present disclosure.

FIG. 4 shows a flowchart of an example method 400 of the correction of reference clock systematic errors of the UE according to some example embodiments of the present disclosure. The method 400 can be implemented at the first device 110 as shown in FIG. 1. For the purpose of discussion, the method 400 will be described with reference to FIG. 1.

At 410, the first device generates reference time information comprising a first local timestamp of the first device at a boundary of a system frame number.

At 420, the first device transmits, to the second device, the reference time information to a second device for time synchronization between the first device and the second device.

In some example embodiments, if the first device determines that a request for the reference time information of the first device is received from the second device, the first device may determine the system frame number associated with the reference time information to be reported to the second device. The first device may generate the first local timestamp of the first device based on the system frame number and generate the reference time information based on the first local timestamp.

In some example embodiments, the first device may transmit, to the second device, a request for initiating the time synchronization between the first device and the second device, receive, from the second device, a further reference time information of the second device comprises a reference timestamp of the second device at the boundary of the system frame number; and generate the reference time information of the first device based on the reference timestamp of the second device, the system frame number and a propagation delay between the first device and the second device.

In some example embodiments, if the first device determines that an indication of a time offset for the time correction between the first device and the second device is receive, the first device may perform the time correction based on the time offset.

In some example embodiments, the first device may receive, from the second device, a physical layer reconfiguration information to the first device, the physical layer reconfiguration information comprises an indication of a delivery rate of the reference time information of the first device, an indication of a delivery rate of the reference time information of the first device, an indication of a bandwidth and a periodicity for a reference signal transmitted from the first device, an indication of a bandwidth and a periodicity for a reference signal transmitted from the second device, or an indication of a resolution for a signaling of propagation delay.

In some example embodiments, the first device comprises a terminal device and the second device comprises a network device.

Figure 5:
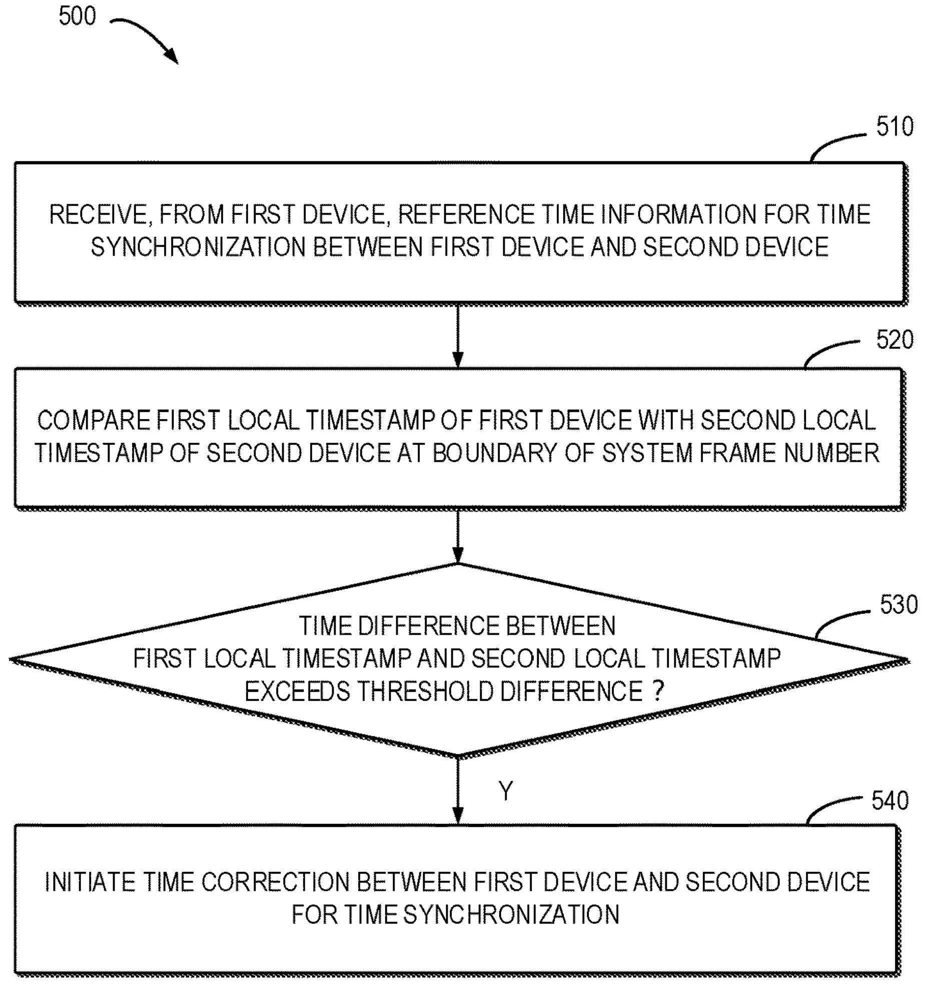
FIG. 5 shows a flowchart of an example method of the correction of reference clock systematic errors of the UE according to some example embodiments of the present disclosure.

FIG. 5 shows a flowchart of an example method 500 of the correction of reference clock systematic errors of the UE according to some example embodiments of the present disclosure. The method 500 can be implemented at the second device 120 as shown in FIG. 1. For the purpose of discussion, the method 500 will be described with reference to FIG. 1.

At 510, the second device receives, from a first device, reference time information for time synchronization between the first device and the second device, the reference time information comprising a first local timestamp of the first device at a boundary of a system frame number.

At 520, the second device compares the first local timestamp of the first device with a second local timestamp of the second device at the boundary of the system frame number.

At 530, if the second device determines that a time difference between the first local timestamp and the second local timestamp exceeds a threshold difference, at 540, the second device initiates a time correction between the first device and the second device for the time synchronization.

In some example embodiments, the second device may generate a time offset for the time correction based on the time difference between the first local timestamp and the second local timestamp; and transmit an indication of the time offset to the first device.

In some example embodiments, the second device may transmit a physical layer reconfiguration information to the first device, the physical layer reconfiguration information comprises an indication of a delivery rate of the reference time information of the first device, an indication of a delivery rate of the reference time information of the first device, an indication of a bandwidth and a periodicity for a reference signal transmitted from the first device, an indication of a bandwidth and a periodicity for a reference signal transmitted from the second device, or an indication of a resolution for a signaling of propagation delay.

In some example embodiments, the second device may transmit, to access and mobility management function, an indication that a time correction is to be performed for the first device.

In some example embodiments, if the second device determines that a request for initiating the time synchronization between the first device and the second device is received, the second device may generate a reference timestamp of the second device at the boundary of the system frame number; and transmit, to the first device, a further reference time information of the second device comprising the reference timestamp.

In some example embodiments, the first device comprises a terminal device and the second device comprises a network device.

In some example embodiments, an apparatus capable of performing the method 400 (for example, implemented at the UE 110) may comprise means for performing the respective steps of the method 400. The means may be implemented in any suitable form. For example, the means may be implemented in a circuitry or software module.

In some example embodiments, the apparatus comprises means for generating, at a first device, reference time information comprising a first local timestamp of the first device at a boundary of a system frame number; and means for transmitting the reference time information to a second device for time synchronization between the first device and the second device.

In some example embodiments, an apparatus capable of performing the method 500 (for example, implemented at the gNB 120) may comprise means for performing the respective steps of the method 500. The means may be implemented in any suitable form. For example, the means may be implemented in a circuitry or software module.

In some example embodiments, the apparatus comprises means for receiving, at a second device and from a first device, reference time information for time synchronization between the first device and the second device, the reference time information comprising a first local timestamp of the first device at a boundary of a system frame number; means for comparing the first local timestamp of the first device with a second local timestamp of the second device at the boundary of the system frame number; and means for in accordance with a time difference between the first local timestamp and the second local timestamp exceeds a threshold difference, initiating a time correction between the first device and the second device for the time synchronization.

Figure 6:
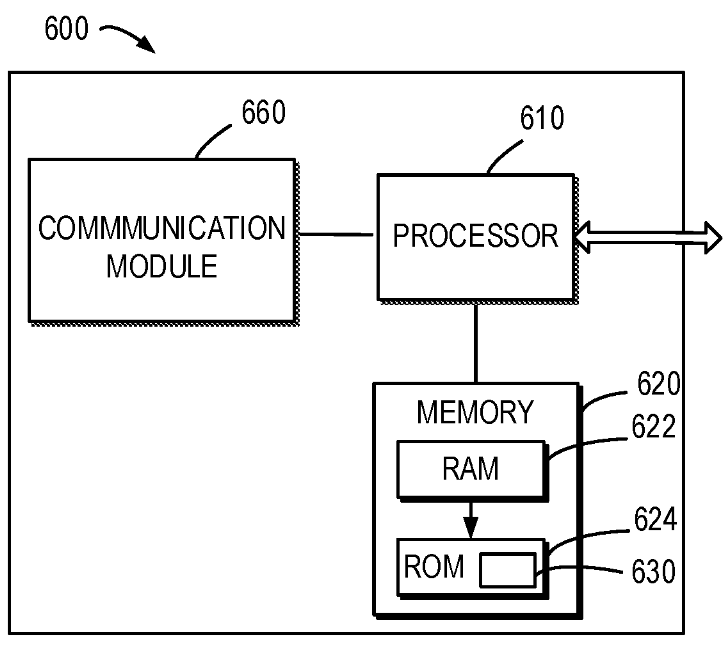
FIG. 6 shows a simplified block diagram of a device that is suitable for implementing example embodiments of the present disclosure.

FIG. 6 is a simplified block diagram of a device 600 that is suitable for implementing embodiments of the present disclosure. The device 600 may be provided to implement the communication device, for example the UE 110 and the gNB 120 as shown in FIG. 1. As shown, the device 600 includes one or more processors 610, one or more memories 640 coupled to the processor 610, and one or more transmitters and/or receivers (TX/RX) 640 coupled to the processor 610.

The TX/RX 640 is for bidirectional communications. The TX/RX 640 has at least one antenna to facilitate communication. The communication interface may represent any interface that is necessary for communication with other network elements.

The processor 610 may be of any type suitable to the local technical network and may include one or more of the following: general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The memory 620 may include one or more non-volatile memories and one or more volatile memories. Examples of the non-volatile memories include, but are not limited to, a Read Only Memory (ROM) 624, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 622 and other volatile memories that will not last in the power-down duration.

A computer program 630 includes computer executable instructions that are executed by the associated processor 610. The program 630 may be stored in the ROM 620. The processor 610 may perform any suitable actions and processing by loading the program 630 into the RAM 620.

The embodiments of the present disclosure may be implemented by means of the program 630 so that the device 600 may perform any process of the disclosure as discussed with reference to FIGS. 2 to 5. The embodiments of the present disclosure may also be implemented by hardware or by a combination of software and hardware.

Figure 7:
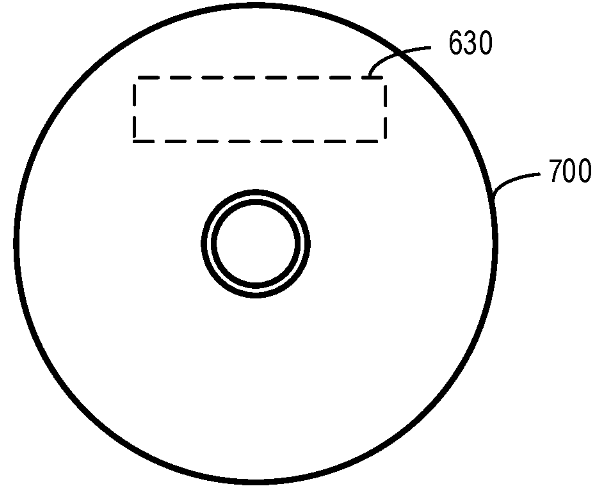
FIG. 7 shows a block diagram of an example computer readable medium in accordance with some embodiments of the present disclosure.

In some embodiments, the program 630 may be tangibly contained in a computer readable medium which may be included in the device 600 (such as in the memory 620) or other storage devices that are accessible by the device 600. The device 600 may load the program 630 from the computer readable medium to the RAM 622 for execution. The computer readable medium may include any types of tangible non-volatile storage, such as ROM, EPROM, a flash memory, a hard disk, CD, DVD, and the like. FIG. 7 shows an example of the computer readable medium 700 in form of CD or DVD. The computer readable medium has the program 630 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, device, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 400-500 as described above with reference to FIGS. 4-5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing device, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, device or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, device, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device comprising:

at least one processor; and at least one memory including program codes;

the at least one memory and the program codes are configured to, with the at least one processor, cause the first device at least to:

generate reference time information comprising a first local timestamp of the first device at a boundary of a system frame number;

transmit the reference time information to a second device for time synchronization between the first device and the second device;

in accordance with a determination that an indication of a time offset for a time correction between the first device and the second device is received, perform the time correction based on the time offset; and wherein the first device is caused to generate the reference time information by:

in accordance with a determination that a request for the reference time information of the first device is received from the second device, determining the system frame number associated with the reference time information to be reported to the second device;

generating the first local timestamp of the first device based on the system frame number; and generating the reference time information based on the first local timestamp.

2. A second device comprising:

at least one processor; and at least one memory including program codes;

the at least one memory and the program codes are configured to, with the at least one processor, cause the second device at least to:

receive, from a first device, reference time information for time synchronization between the first device and the second device, the reference time information comprising a first local timestamp of the first device at a boundary of a system frame number;

compare the first local timestamp of the first device with a second local timestamp of the second device at the boundary of the system frame number; and in accordance with a time difference between the first local timestamp and the second local timestamp exceeds a threshold difference, initiate a time correction between the first device and the second device for the time synchronization.

3. The second device of claim 2, wherein the second device is caused to initiate the time correction by:

generating a time offset for the time correction based on the time difference between the first local timestamp and the second local timestamp; and transmitting an indication of the time offset to the first device.

4. The second device of claim 2, wherein the second device is caused to initiate the time correction by:

transmitting a physical layer reconfiguration information to the first device, the physical layer reconfiguration information comprises at least one of the following:

an indication of a delivery rate of the reference time information of the first device, an indication of a granularity of the reference time information of the first device, an indication of a reconfiguration of an estimation for a propagation delay between the first device and the second device, an indication of a bandwidth and a periodicity for a reference signal transmitted from the first device, an indication of a bandwidth and a periodicity for a reference signal transmitted from the second device, or an indication of a resolution for a signaling of propagation delay.

5. The second device of claim 2, wherein the second device is caused to initiate the time correction by:

transmitting, to an access and mobility management function, an indication that a time correction is to be performed for the first device.

6. The second device of claim 2, wherein the second device is further caused to:

in accordance with a determination that a request for initiating the time synchronization between the first device and the second device is received, generate a reference timestamp of the second device at the boundary of the system frame number; and transmit, to the first device, a further reference time information of the second device comprising the reference timestamp.

7. The second device of claim 2, wherein the first device comprises a terminal device and the second device comprises a network device.

8. A method comprising:

generating, at a first device, reference time information comprising a first local timestamp of the first device at a boundary of a system frame number;

transmitting the reference time information to a second device for time synchronization between the first device and the second device; and in accordance with a determination that an indication of a time offset for a time correction between the first device and the second device is received, performing the time correction based on the time offset;

wherein generating the reference time information comprises:

in accordance with a determination that a request for the reference time information of the first device is received from the second device, determining the system frame number associated with the reference time information to be reported to the second device;

generating the first local timestamp of the first device based on the system frame number; and generating the reference time information based on the first local timestamp.

* * * * *